Dec. 15, 1953  A. C. FERGUSON  2,662,287
MULTIPOINT REMOVABLE BLADE KNIFE
Filed Sept. 18, 1950
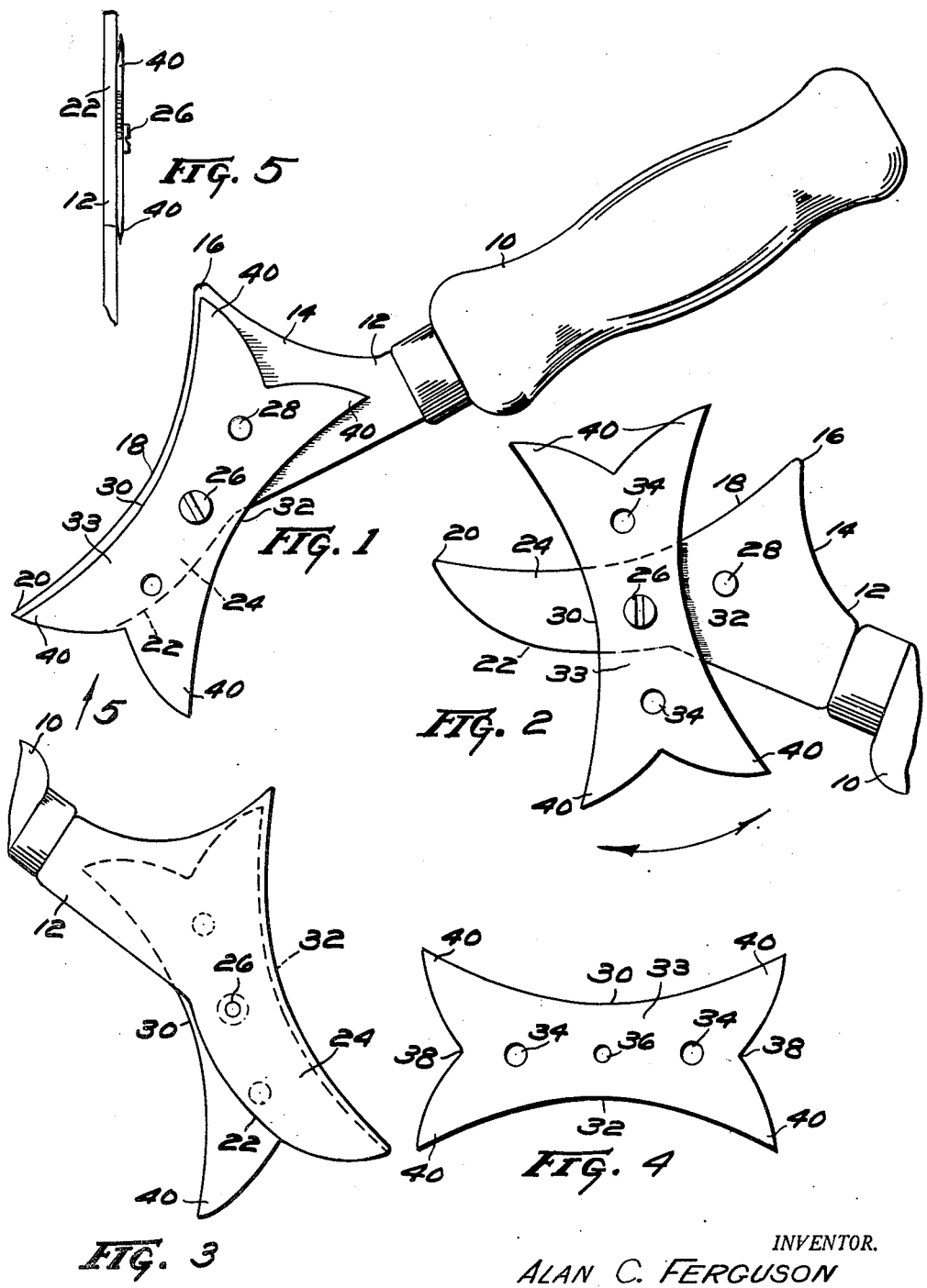
INVENTOR.
ALAN C. FERGUSON
BY
Charles R. Fay,
ATTORNEY Patented Dec. 15, 1953

2,662,287

UNITED STATES PATENT OFFICE 2,662,287

MULTIPOINT REMOVABLE BLADE KNIFE

Alan C. Ferguson, Southbridge, Mass., assignor to Hyde Manufacturing Company, Southbridge, Mass., a corporation of Massachusetts Application September 18, 1950, Serial No. 185,444

4 Claims. (Cl. 30—287)

This invention relates to a new and improved multiple-point removable blade cutting knife particularly of the draw type used for cutting roofing material, linoleum, and for similar purposes.

The principal object of the invention resides in the provision of a device of the class described having a plurality of points and cutting edges, double the number heretofore proposed in the prior art, so that the knife blade has a useful life double any heretofore known.

Another object of the invention resides in the provision of a removable blade knife having four points, the blade having a general X-shape, each point of the X providing a sharp edge useful for cutting particularly in a drawing cut, in combination with a holder having a particular shape to accommodate the shape of the blade, holding and protecting the same and also protecting the operator thereof against injury.

A further object of the invention resides in the provision of a removable and replaceable blade knife, said blade having two concave elongated sharp edges arranged in a back-to-back relation and forming four separate useful cutting edges, said blade having a holder therefor which covers three of the four cutting areas so that only one thereof can be used at a time, whereby the blade is easily changed when one edge becomes dull, in a progressive series providing four separate cutting edges for the knife.

Other objects and advantages of the invention will appear hereinafter.

Reference is to be had to the accompanying drawings, in which

Fig. 1 is a view in elevation of the knife and the blade in condition to be used;

Fig. 2 illustrates the manner in which the blade is rotated to present a new cutting edge;

Fig. 3 is a view similar to Fig. 1, but showing the device from the other side thereof;

Fig. 4 is a plan view of the blade itself; and

Fig. 5 is an edge view looking in the direction of arrow 5 in Fig. 1.

As shown in Fig. 1, there is provided a handle 10 to which is secured by any desired or convenient means, a tang 12. This tang has a new shape including a generally concave edge 14 terminating at a rounded point 16. From the point 16 the edge of the tang, which may be also referred to as the blade holder and guard, proceeds along another concave edge 18 which is longer than that at 14 and starts out from the point 16 at an acute angle with respect to the edge 14.

The edge 18 terminates in a rounded point 20 and a convex edge then proceeds as at 22 in a reverse direction back toward the handle 10 providing a relatively narrow guard portion 24 forming a long, projecting nose or the like. This guard portion then merges into the tang portion 12. The shape of this blade holder and guard is probably best shown in Fig. 2 and it is provided with a removable securing device for the blade to be described. In this case, the device for securing the blade comprises a screw 26 threaded into the guard generally centrally of the length thereof. Also, a boss or lateral projection 28 is provided at a point spaced from the pivot 26. It will be seen that the guard provides a relatively narrow elongated portion 24 merging into a sharp angular portion at 18.

The blade itself is best shown in Fig. 4 and it comprises a flat steel body having sharp edges 30 and 32, these edges being concave and arranged back-to-back on the body portion 33. The latter is provided with three holes 34 and 36, the central hole 36 receiving the screw 26 as clearly shown in Figs. 1 and 2, and the holes 34 being received on stud 28, alternatively. The ends of the body 33 are indented as at 38 to provide the pointed areas 40 of which there are four. Thus the blade has a narrow waist portion centrally thereof and flaring ends which have sharpened edges.

The edges 30, 32 conform in general to the curve at 18 on the guard and blade holder but when the blade is in position thereon, see Figs. 1 and 3, the edge 18 is definitely arranged to guard the edge 30 by extending therebeyond, and the same is true of the pointed area 16 which guards the area 40 of the knife which is diametrically opposite the portion 40 which is being used in Fig. 1.

It will be seen that the blade may be rotated as shown in Fig. 2 to provide that the point 40 guarded by angle 16 in Fig. 1 is next to be used after the point 40 in Fig. 1 has become dull, and thereafter the blade is merely completely removed instead of being rotated so that the other two cutting areas may become useful by inverting the blade as a whole, and then rotating as before to use the fourth cutting edge.

Having thus described my invention and the advantages thereof, I do not wish to be limited to the details herein disclosed, otherwise than as set forth in the claims, but what I claim is:

1. A blade, and a blade holder and guard therefor comprising a handle and a tang, a long projecting nose on the tang and a lateral projection thereon intermediate the handle and the end of the nose, the edge of the holder between the end of the nose and the lateral projection being concave, a blade having opposite concave cutting edges, and means to hold the blade on the holder with one concave cutting edge inset from and guarded by the concave edge of the holder, the other concave cutting edge being partially exposed.

2. The device of claim 1 wherein said means comprises an axle upon which the blade is rotatable to expose selected different cutting edge areas.

3. A blade, and a blade holder and guard for the blade, said blade having a pair of opposite concave cutting edges forming a relatively narrow waist portion and two pairs of diverging cutting portions, said blade holder and guard comprising a generally flat plate, a pin thereon for rotatably and removably holding the blade at the center thereof, said plate having a concave edge extending beyond one entire concave cutting edge of the blade and guarding the same, said plate having an enlarged portion overlapping the edges of and guarding one pair of diverging cutting edges of the blade, said enlarged plate portion having an edge forming a part of the said plate concave edge, but one selected cutting portion of one pair of diverging cutting portions being thereby exposed for cutting purposes at one time.

4. The device of claim 3 including a tang extending away from the plate enlarged portion, and a handle on the tang, the exposed cutting edge facing the handle for draw cutting.

ALAN C. FERGUSON.

References Cited in the file of this patent

UNITED STATES PATENTS

| Number | Name | Date |
|---|---|---|
| 483,588 | Sunderlin | Oct. 4, 1892 |
| 791,623 | Holmes | June 6, 1905 |
| 1,523,797 | Bauer | Jan. 20, 1925 |
| 1,876,180 | Tobin | Sept. 6, 1932 |
| 1,961,132 | Behrman | June 5, 1934 |
| 2,140,021 | Mallen | Dec. 13, 1938 |
| 2,141,224 | Rich | Dec. 27, 1938 |
| 2,215,216 | Gits et al. | Sept. 17, 1940 |
| 2,329,833 | Gardella et al. | Sept. 21, 1942 |